(12) United States Patent
Yuyama et al.

(10) Patent No.: US 7,930,060 B2
(45) Date of Patent: Apr. 19, 2011

(54) MEDICINE SUPPLY SYSTEM

(75) Inventors: Shoji Yuyama, Toyonaka (JP); Akitomi Kohama, Toyonaka (JP); Tatsuaki Kunimoto, Toyonaka (JP); Takashi Itou, Toyonaka (JP)

(73) Assignee: Yuyama Mfg. Co., Ltd., Osaka (JP)

( * ) Notice: Subject to any disclaimer, the term of this patent is extended or adjusted under 35 U.S.C. 154(b) by 488 days.

(21) Appl. No.: 11/587,540

(22) PCT Filed: Apr. 27, 2005

(86) PCT No.: PCT/JP2005/008023
§ 371 (c)(1),
(2), (4) Date: May 11, 2007

(87) PCT Pub. No.: WO2005/105619
PCT Pub. Date: Nov. 10, 2005

(65) Prior Publication Data
US 2009/0050444 A1 Feb. 26, 2009

(30) Foreign Application Priority Data
Apr. 30, 2004 (JP) ................................. 2004-136511

(51) Int. Cl.
*G06F 7/00* (2006.01)
(52) U.S. Cl. ........................................ 700/214; 700/231
(58) Field of Classification Search .................. 700/216, 700/214, 215, 219, 213, 231, 242, 243
See application file for complete search history.

(56) References Cited

U.S. PATENT DOCUMENTS

| | | | |
|---|---|---|---|
| 5,688,858 A | | 11/1997 | Quednau et al. |
| 5,905,653 A | * | 5/1999 | Higham et al. ............... 700/244 |
| 5,988,858 A | * | 11/1999 | Yuyama et al. ............... 700/230 |
| 6,308,109 B1 | * | 10/2001 | Yuyama et al. ............... 700/228 |
| 6,701,218 B2 | * | 3/2004 | Koike et al. ................... 700/235 |
| 2002/0063698 A1 | | 5/2002 | Koike et al. |
| 2003/0230590 A1 | * | 12/2003 | Gilmore ........................... 221/2 |

FOREIGN PATENT DOCUMENTS

| | | |
|---|---|---|
| CA | 2 363 635 | 5/2002 |
| JP | 4-112128 | 4/1992 |
| JP | 8-310625 | 11/1996 |
| JP | 11-16984 | 1/1999 |
| JP | 2002-120913 | 4/2002 |

(Continued)

*Primary Examiner* — Gene Crawford
*Assistant Examiner* — Ramya Prakasam
(74) *Attorney, Agent, or Firm* — Wenderoth, Lind & Ponack, L.L.P.

(57) ABSTRACT

A medicine supply system including a cart supply line (48) on which a plurality of carts (8) are disposed and aligned; a first transport unit for transporting the plurality of carts (8) on the cart supply line (48); a tray discharge unit (2) for storing the trays (7) in the plurality of carts; a second transport unit for transporting the plurality of carts with the trays stored in the tray discharge unit; a cart discharge line (49) on which the plurality of carts transported by the second transport unit are aligned; a tray supply lifter (1) for supplying the trays; a tray transport line (3) for transporting the trays supplied by the tray supply lifter to the tray discharge unit; a medicine dispensing unit (4) for dispensing the medicine to the trays, and a control unit (10) for supplying the trays from the tray supplying lifter 1 based on prescription data, dispensing the medicine into the trays, transporting the trays to the tray discharge unit, and storing the trays into the carts.

9 Claims, 14 Drawing Sheets

FOREIGN PATENT DOCUMENTS

| | | |
|---|---|---|
| JP | 2002-165865 | 6/2002 |
| JP | 2002-191688 | 7/2002 |
| JP | 2002-347931 | 12/2002 |
| JP | 2003-93450 | 4/2003 |

* cited by examiner

Fig.4
(a)
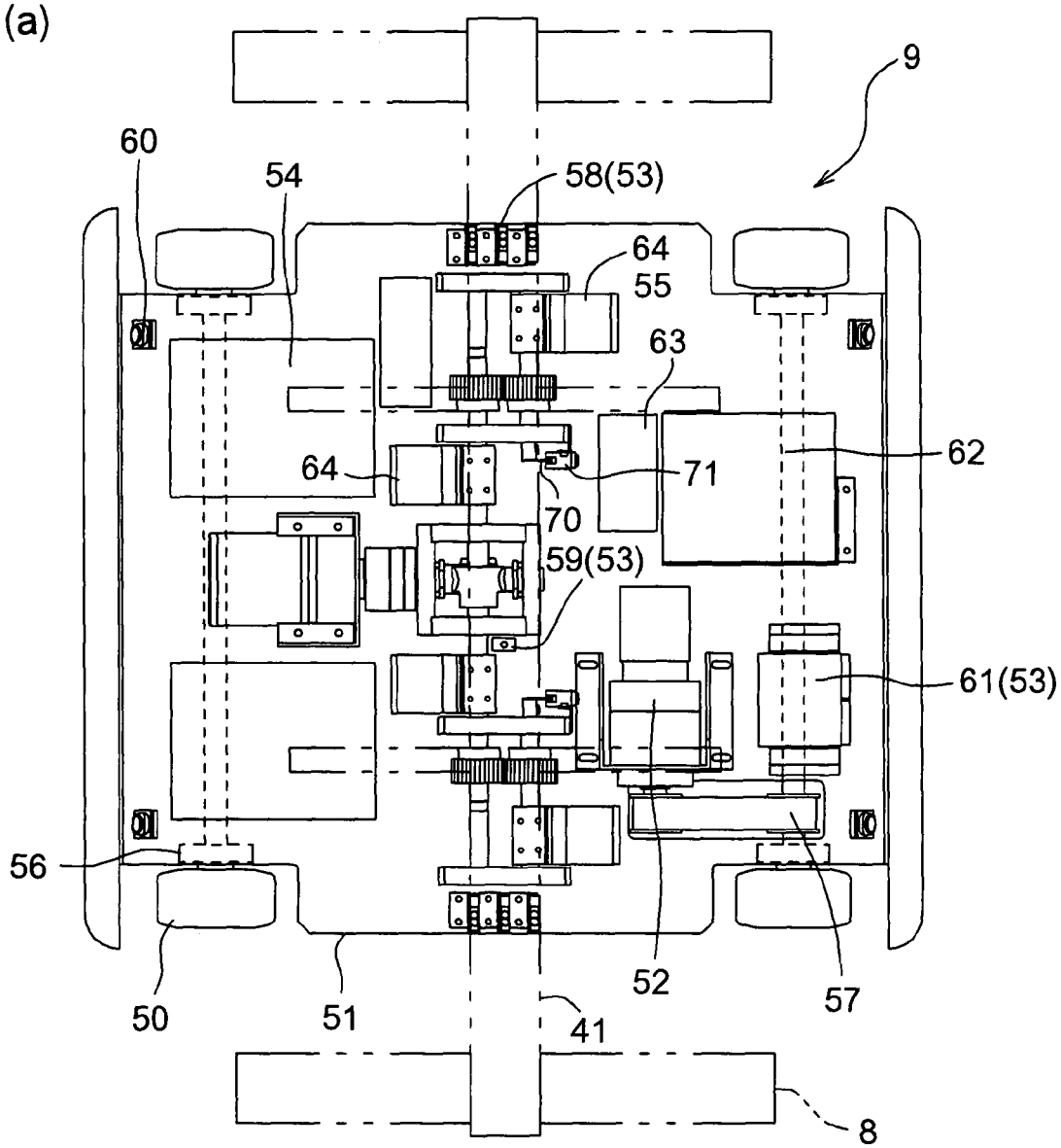
(b)
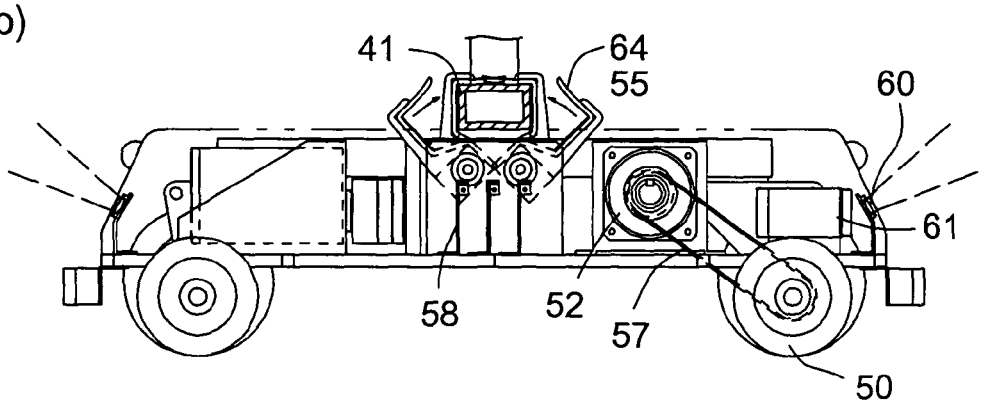

Fig.13
(a)
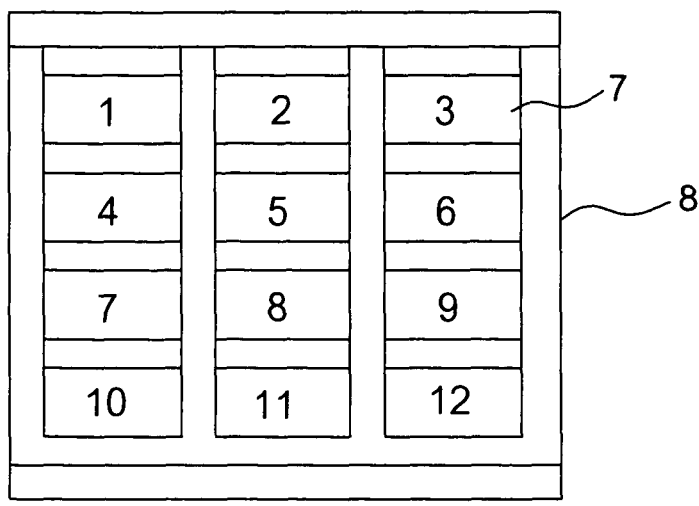
(b)
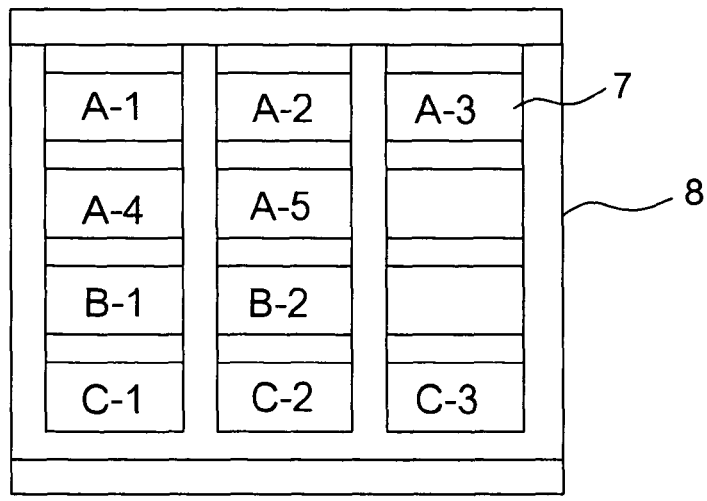
(c)
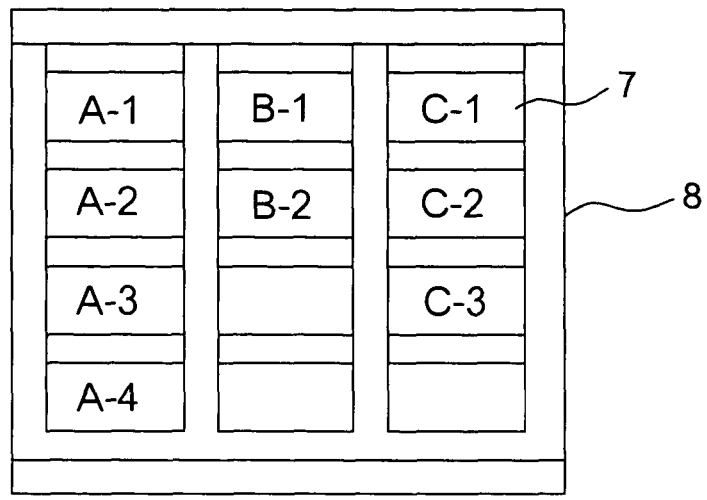

MEDICINE SUPPLY SYSTEM

BACKGROUND OF THE INVENTION

1. Technical Field

The present invention relates to a medicine supply system in which trays containing medicine can be automatically stored in a cart for transporting the medicine to a hospital ward and so on.

2. Description of the Related Art

Conventionally, in the case of transporting medicine from a pharmacy department, medicine for one patient contained in a tray which is automatically transported to a nurse station using a transport unit (see, for example, JP A 8-310625). As it is inefficient to transport the medicine separately from the nurse station to each patient's room, the trays are stored in a cart and the cart is transported.

However, the work associated with storing the number of trays in the cart is very troublesome. As a construction in which the trays contained in the cart do not drop during transport by the cart is adopted, the trays are difficult to store in the cart. Thus, conventionally automatic storage of trays into carts has been needed, though no solution has yet been found.

SUMMARY OF THE INVENTION

It is an object of the present invention to provide a medicine supply system that will enable automatic supply and discharge of carts, supply and discharge of trays and storage of medicine to the trays.

The present invention provides a medicine supply system as means to solve the problems, comprising:

a plurality of carts each having a plurality of storage areas in which trays are stored;

a cart supply line on which the plurality of carts with the plurality of storage areas empty are disposed and aligned;

a first transport unit for sequentially transporting the plurality of carts aligned on the cart supply line;

a tray discharge unit for storing the trays with the medicine contained in each of the plurality of carts;

a second transport unit for transporting the plurality of carts with the trays stored in the tray discharge unit;

a cart discharge line on which the plurality of carts transported by the second transport unit are aligned;

a tray supply unit for supplying the trays;

a tray transport line for transporting the trays supplied by the tray supply unit to the tray discharge unit;

a medicine dispensing unit for dispensing the medicine to the tray, the medicine dispensing unit being disposed on the midway of the tray transport line; and a control unit for supplying the tray from the tray supplying unit based on a prescription data, dispensing the medicine included in the prescription data into the tray, transporting the tray with the medicine dispensed to the tray discharge unit, and storing the tray into the cart supplied from the cart supply line.

According to this construction, if the plurality of carts are disposed and aligned on the cart supply line, the plurality of carts can be sequentially transported to the tray discharge unit by the first transport unit. In the cart transported to the tray discharge unit, each tray in which the medicine is dispensed by the medicine dispensing unit based on the prescription data and which is transported along the tray transport line can be automatically stored. The cart with the trays stored thereon can be automatically transported to the cart discharge line by the second transport unit. Therefore, by only disposing the plurality of carts on the cart supply line, dispensing the medicine into the trays, transporting the carts, and storing the trays in the storage areas of the cart can be automatically conducted to align the carts on the cart discharge line.

The tray discharge unit, the first transport unit and the second transport unit may have a communication portion respectively and the control unit may allow the first transport unit and the second transport unit to transport the cart through the communication portion.

In this case, it is preferable that after completion of storage of the trays into the cart, the control unit transmits a tray storage completion signal to the communication portion of the second transport unit through the communication portion of the tray discharge unit. Then, after the communication portion of the second transport unit receives the tray storage completion signal, the second transport unit transports the cart. It is preferable that the communication portions communicate with each other through optical communication.

A stack lifter may be provided on the tray transport line to stack the trays with the medicine dispensed by the medicine dispensing unit and put the trays on standby. If the control unit decides that the medicine dispensed in the tray on the tray transport line by the medicine dispensing unit is a temporary prescription, the control unit may allow the stack lifter to stack the trays and put the trays on standby.

The temporary prescription means prescriptions other than a regular prescription such as an urgent prescription for a patient whose condition is rapidly changing, an alteration prescription in the case where a medicine that has been dosed for a long time had no effect, and an off-duty prescription that is caused outside the usual working hours in the hospital. The regular prescription means a medicine prescription for a usual inpatient whose condition is stable.

According to this construction, in the case of a regular prescription, the trays can be sequentially stored in the storage areas of the cart by the tray shift unit; and in the case of a temporary prescription, the trays can be stacked in the stack lifter to put the trays on standby. Therefore, the medicine for the temporary prescription can be taken out from the stack lifter in order to quickly respond to the emergency.

A card rewrite unit may be provided on the tray transport line to rewrite predetermined information on an identification card attached on the tray with the medicine dispensed by the medicine dispensing unit. Also, the control unit may allow the card rewrite unit to rewrite the predetermined information on the identification card based on the prescription data inputted and allow the tray discharge unit to store the tray with the identification card attached in the predetermined storage area of the cart.

According to this construction, it is possible, for example, to transport the carts to the hospital wards and effectively deliver the trays stored in the storage areas to the patients without error.

According to the present invention, the carts aligned on the cart supply line are sequentially transported to the tray discharge unit, the trays with the medicine dispensed are stored in the storage areas, and the carts are aligned on the cart discharge line. Therefore, dispensing the medicine into the trays, transporting the carts, and storing the trays in the storage areas of the cart can be automatically conducted, making it possible to improve the efficiency of the process.

BRIEF DESCRIPTION OF THE DRAWINGS

FIG. 4(a) is a plan view showing an internal construction of a tray transport unit and FIG. 4(b) is a front view of FIG. 4(a);

FIGS. 13(a), (b), (c) are front views showing examples of the trays stored in the cart;

EXPLANATION OF THE REFERENCE NUMERALS

Figure 1:
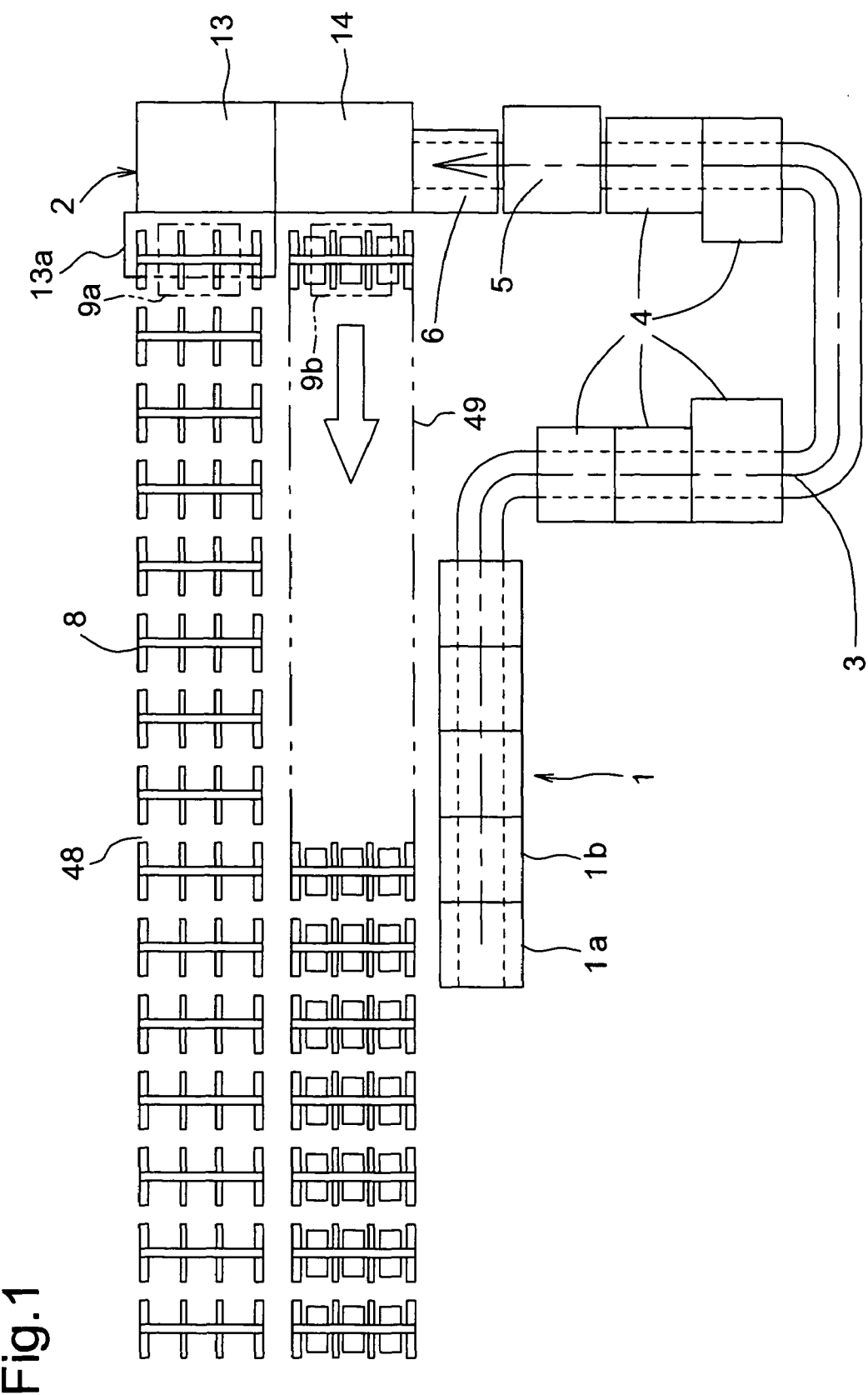
FIG. 1 is a general view showing an outline of medicine supply system according to an embodiment of the present invention.

1 Supply lifter
2 Tray discharge unit
3 Tray transport line
4 Medicine dispensing unit
5 card rewriting unit
6 Stack lifter
7 Tray
8 Cart
9 Cart transport unit
10 Control unit
11 Flange portion
12 Identification card
13 Cart standby portion
14 Tray supply portion
15 Cart shift member
16 First optical communication portion
17 First guide member
18 Elevation motor
19 Gear
20 Guide piece
21 Tray shift unit
22 Vertical rail
23 Horizontal rail
24 Tray holding member
25 Arm portion
26 Pushing portion
27 Second optical communication portion
28 Electromagnet portion
29 Second guide member
30 Guide roller
31 Guide cover
32 Driving belt
33 Slider
34 Pusher
35 Pulley
36 Gear
37 Shift motor
38 Support panel
39 Leg portion
40 Upper connection portion
41 Lower connection portion
42 Grip
43 Support portion
44 Caster
45 Guide groove
46 Storage area
47 Reflection plate
49 Cart discharge line
50 Wheel
51 Frame
52 Drive motor
53 Detection member
54 Control substrate
55 Grip member
56 Bearing member
57 Drive transmission belt
58 Cart detection sensor
59 Position deviation detection sensor
60 Detection sensor
61 Third optical communication portion
62 Pulse driver
63 Signal converter
64 Grip arm
65 Drive shaft
66 Driven shaft
67 Drive gear
68 Driven gear
69 Support table
70 Sensor dog
71 Position detection sensor
72 Current collecting arm
73 Slit
74 Power supply unit
75 Guide rail
76 Trolley
77 Cover
78 Server
79 Input unit

DETAILED DESCRIPTION OF THE PREFERRED EMBODIMENTS

Hereinafter, embodiments of the present invention will be described with reference to the accompanying drawings.

Figure 2:
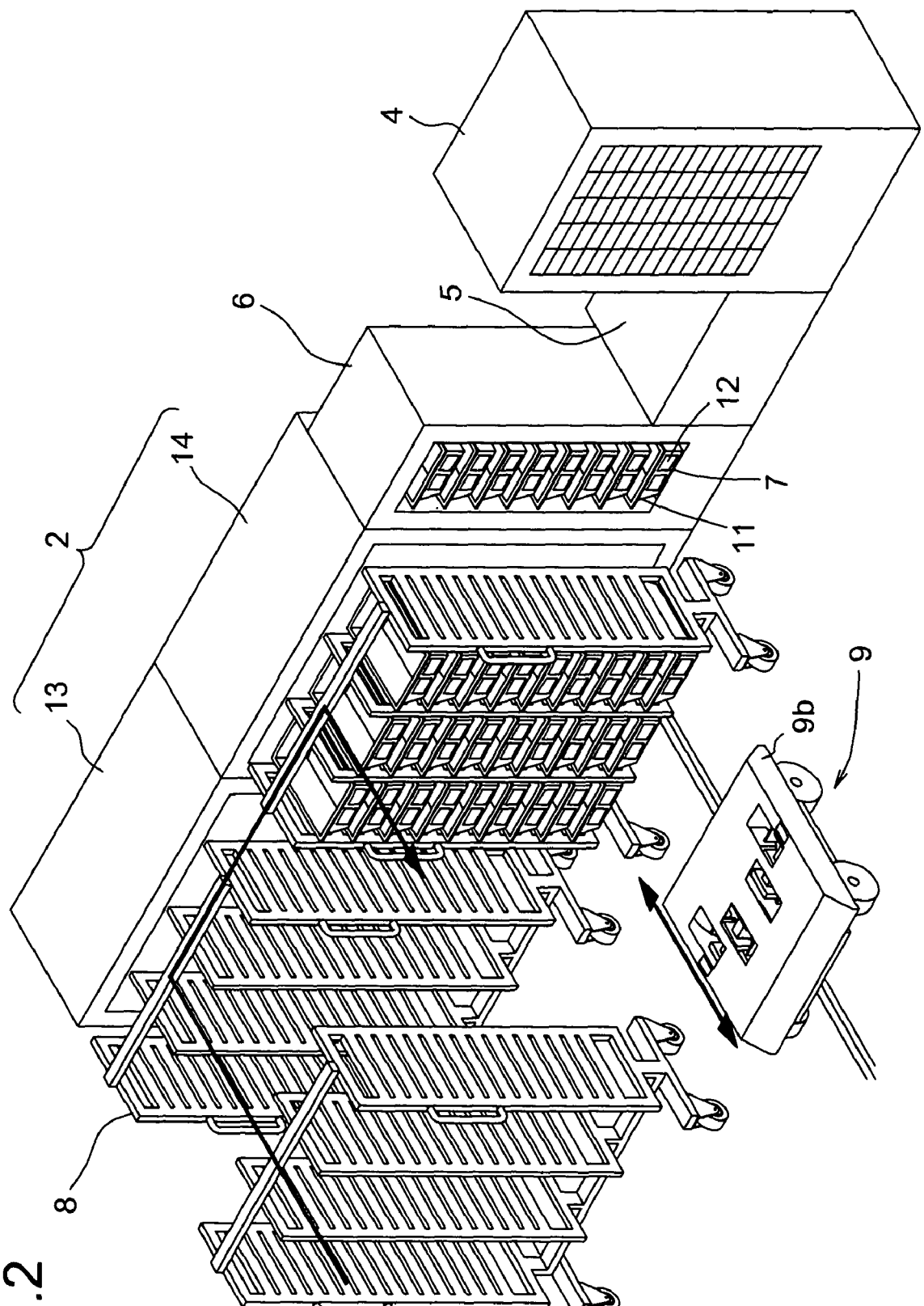
FIG. 2 is a perspective view showing a tray discharge unit of FIG. 1.
Figure 11:
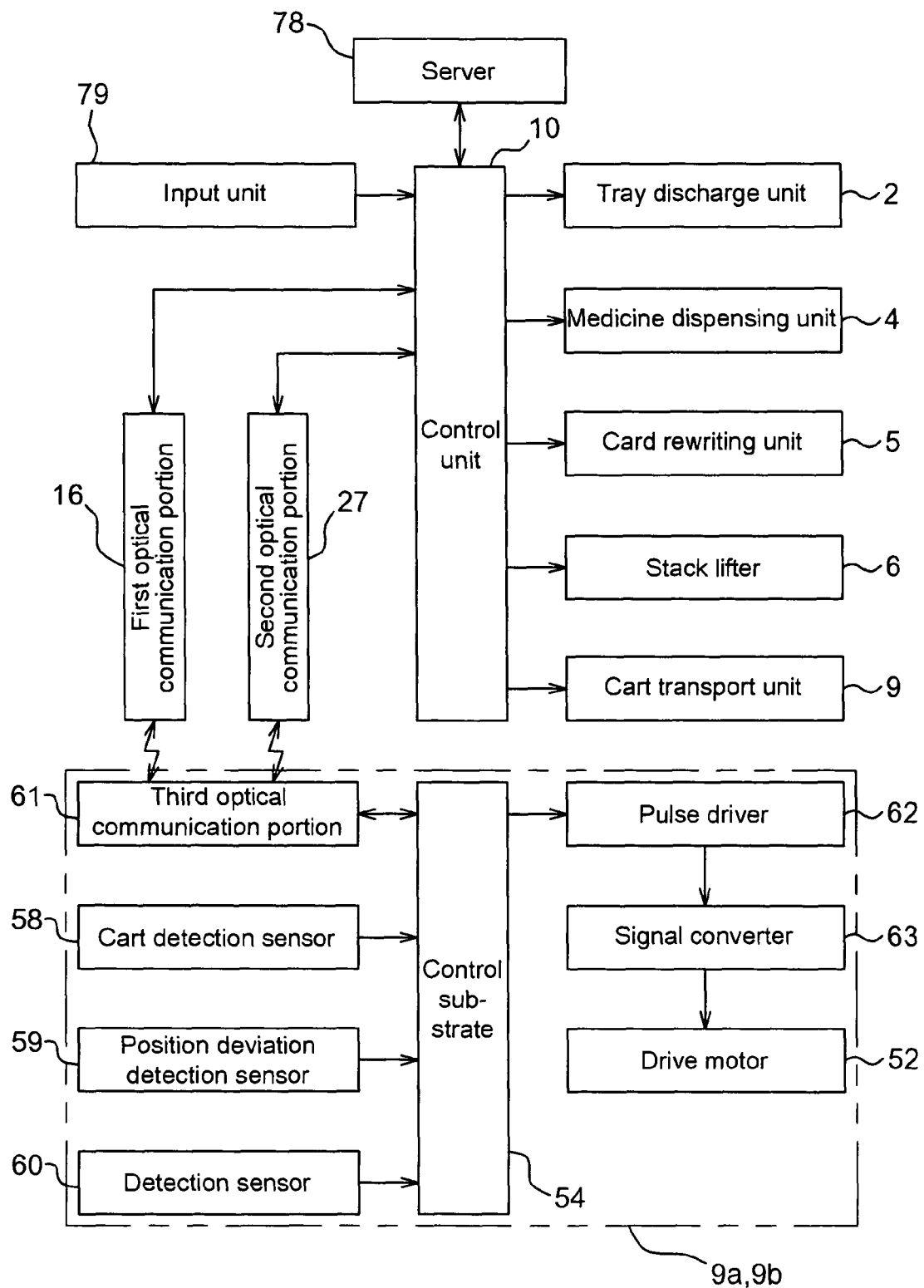
FIG. 11 is a block diagram showing a control unit of the medicine supply system according to the present invention.

FIG. 1 shows a medicine supply system according to an embodiment of the present invention. In the medicine supply system, a plurality of medicine dispensing units 4, card rewriting unit 5 and a stack lifter 6 are disposed on the way of a tray transport line 3 connecting a supply lifter and a tray discharge unit 2. As shown in FIG. 2, there is provided a cart transport unit 9 which transports empty carts 8 to the tray discharge unit 2 and transports the carts 8 with trays 7 stored thereon. As shown in FIG. 11, these members are controlled by a control unit 10.

Figure 3:
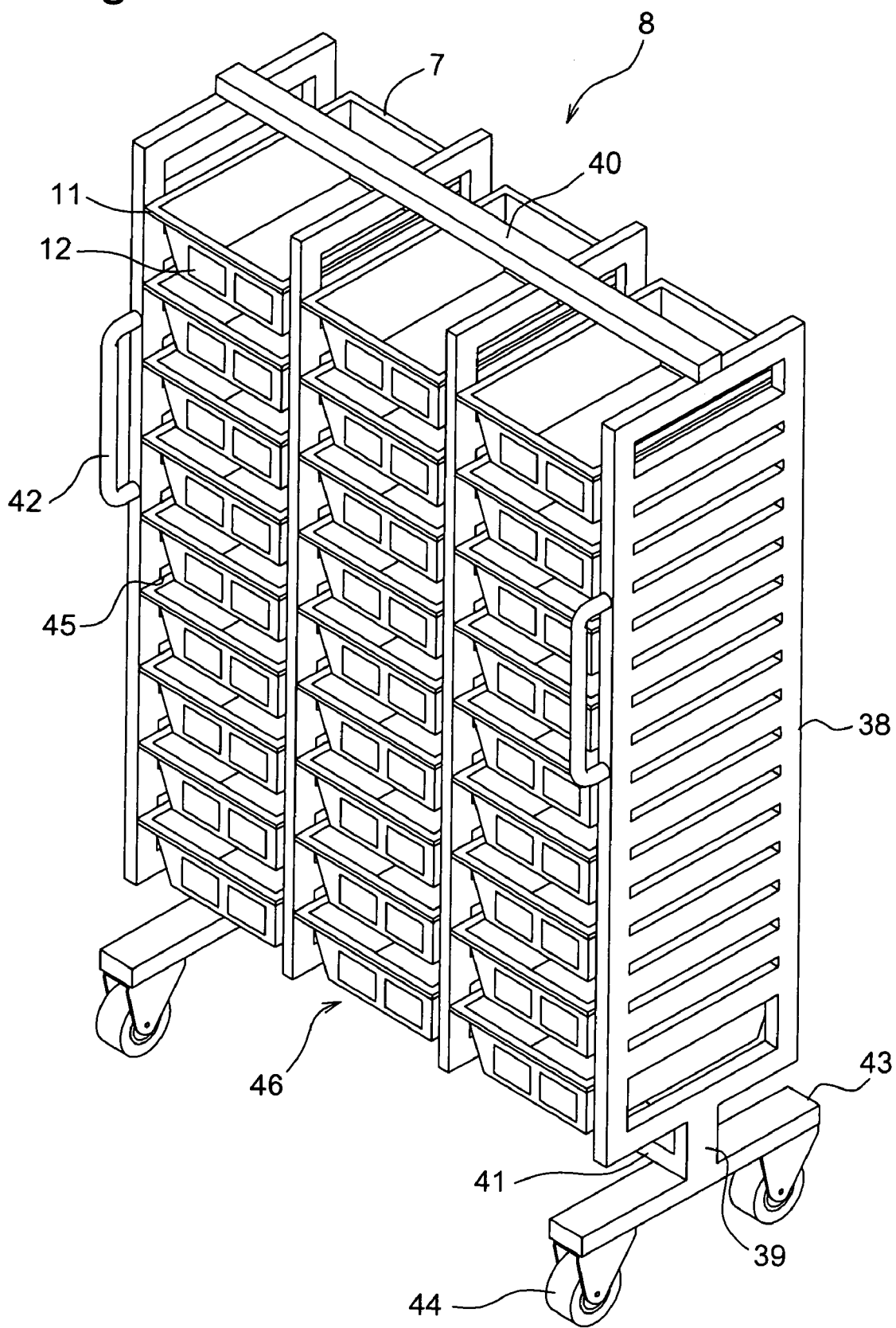
FIG. 3 is a perspective view of a cart with the trays stored.

The supply lifter 1 stores a plurality of trays 7 in a stacked state and sequentially discharges the trays one by one to the tray transport line 3. Each tray 7, as shown in FIG. 3, has a box shape with an open upper surface and a flange portion 11. On the side surface of the tray 7, an identification card 12 can be attached and detached. The identification card 12 is a Lueco type or a thermochromic type of rewrite card, which is rewritable by heating to a predetermined temperature. Patient information and the like is written on the identification card 12.

Figure 7:
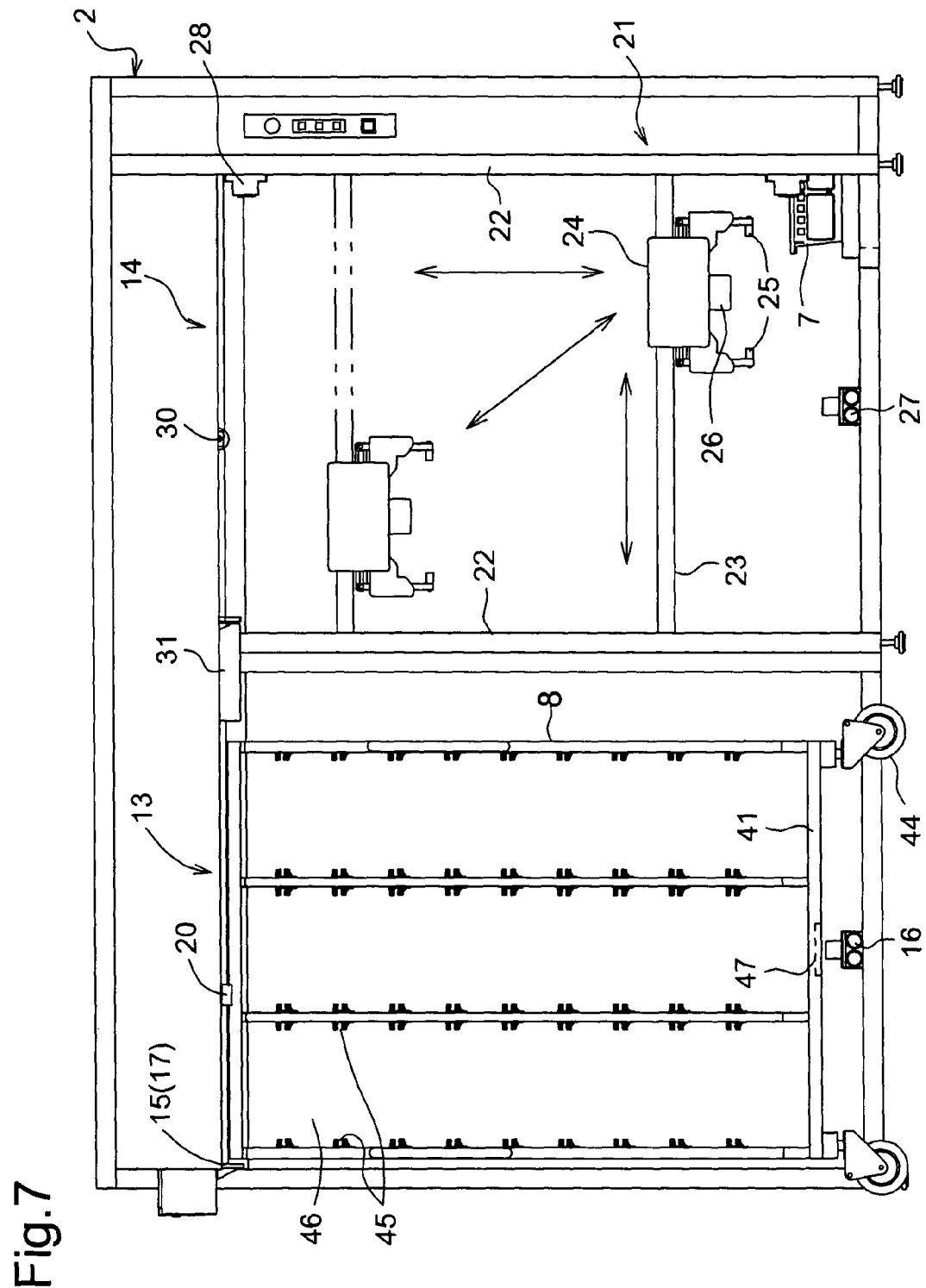
FIG. 7 is a front view of a tray discharge unit.

The tray discharge unit 2, as shown in FIGS. 2 and 7, comprises a cart standby portion 13 and a tray supply portion 14. On the upper part of the tray discharge unit 2 is provided a cart shift member 15. The tray discharge unit 2 sequentially stores the trays 7 with the medicine contained in an empty cart 8.

Figure 9:
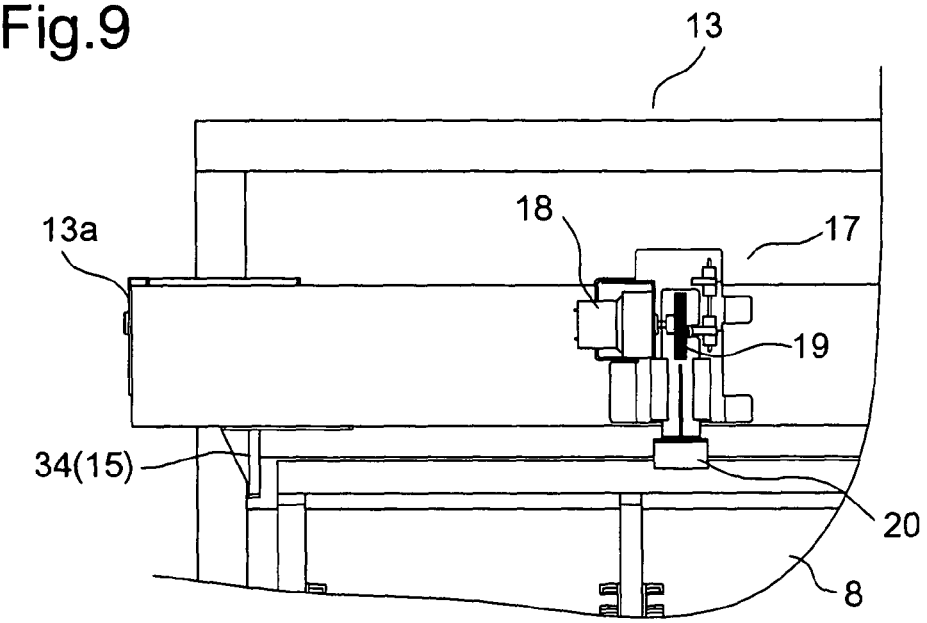
FIG. 9 is an enlarged view showing a part close to a first guide member of FIG. 7.

The cart standby portion 13, as shown in FIG. 7, comprises plate-like members assembled in a rectangular frame and ensures a space for putting the cart 8 on standby at a position along the tray discharge unit 13 in order to be able to quickly shift the cart 8 to next tray supply unit 14. At the middle portion of the lower plate of the cart standby portion 13, a first optical communication portion 16 is provided. The first optical communication portion 16 conducts transmission and receipt of data with a third optical communication portion 61 provided in the cart transport unit 9 which will be described hereinafter. As shown in FIG. 9, at the middle portion of an overhanging portion 13a of the cart standby portion 13 is provided a first guide member 17. The guide member 17 moves a guide piece 20 up and down via a gear 19 by driving an elevation motor. When moving up, the guide piece 20 enables the cart 8 to enter into the cart standby portion 13 from the cart supply line 48. When moving down, the guide piece 20 guides the cart 8 which moves from the cart standby portion to the tray supply portion 14 and prevents the next empty cart 8 from entering.

The tray supply portion 14, as shown in FIG. 7, has the shape of a rectangular frame and is provided with a tray transfer apparatus 21. The tray transfer apparatus 21 has a construction in which a horizontal rail 23 is provided slidably in a vertical direction on vertical rails 22 attached on the plate-like members on both sides of the tray supply portion and a tray holding member 24 is movably provided in a horizontal direction on the horizontal rail 23. The tray holding member 24 comprises arm portions 25 for holding the flange portions 11 of the tray 7 and a push portion 26 for pushing the tray 7 held by the arm portions forward, i.e., toward the cart 8. The tray holding member 24 can move in both the X(horizontal)-direction and the Y (vertical) direction to store the tray 7 in an appropriate storage area 46.

Figure 10:
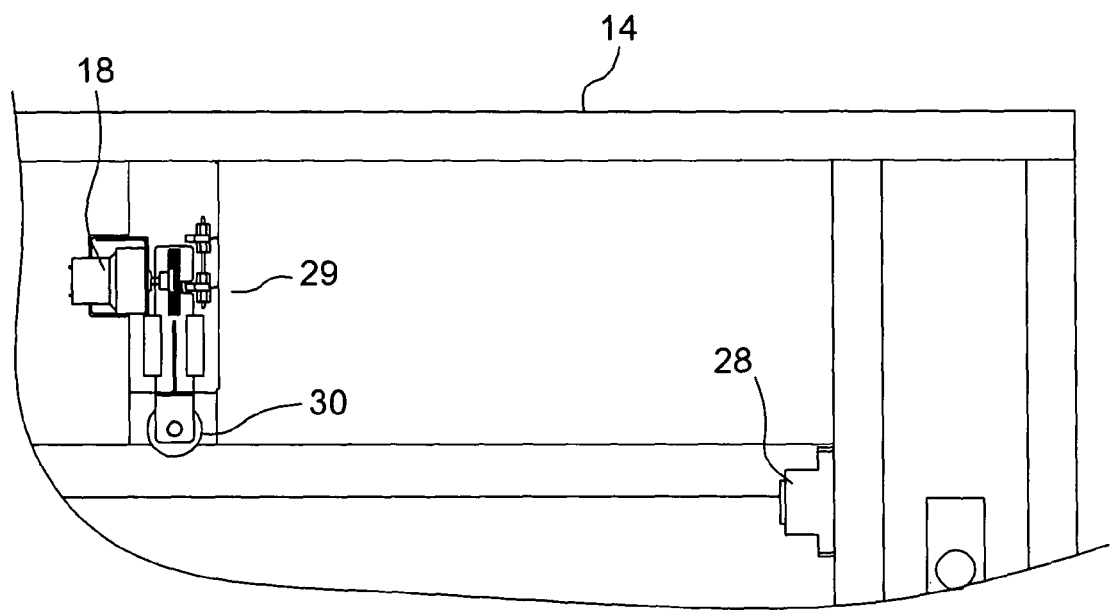
FIG. 10 is an enlarged view showing a part close to a second guide member of FIG. 7.

The tray supply portion 14 is provided with a second optical communication portion 27 which conducts transmission and reception of data with respect to a third optical communication portion 61 provided in the cart transfer apparatus 9 that will be described hereinafter. On the upper portion of the side plate, an electric magnet portion 28 is provided. The electric magnet portion 28 is energized when the empty cart 8 is transferred by the cart shift member 15 so that the cart 8 is attracted and positioned. This prevents displacement of the position of the cart 8 when the cart 8 is stored in the tray discharge unit 2. On the middle portion of the upper plate of the tray supply portion 14, as shown in FIG. 10 is provided a second guide member 29 having the same construction as the first guide member 17. In the second guide member 29, a guide roller 30 is provided instead of the guide piece 20. The guide roller 30 descends to guide the cart 8 moving from the cart standby portion 13 to the tray supply portion 14 and ascends to enable the cart 8 to move from the tray supply portion 14 to the cart discharge line 49.

As shown in FIG. 7, a guide cover 31 is provided on the upper portion of the boundary between the cart standby portion 13 and the tray supply portion 14. The guide cover 31 has a substantially L-shape plate-like body extending from the horizontal direction to the vertically lower direction and prevents displacement of the position of the cart 8 when the cart 8 moves from the cart standby portion 13 to the tray supply portion 14.

Figure 8:
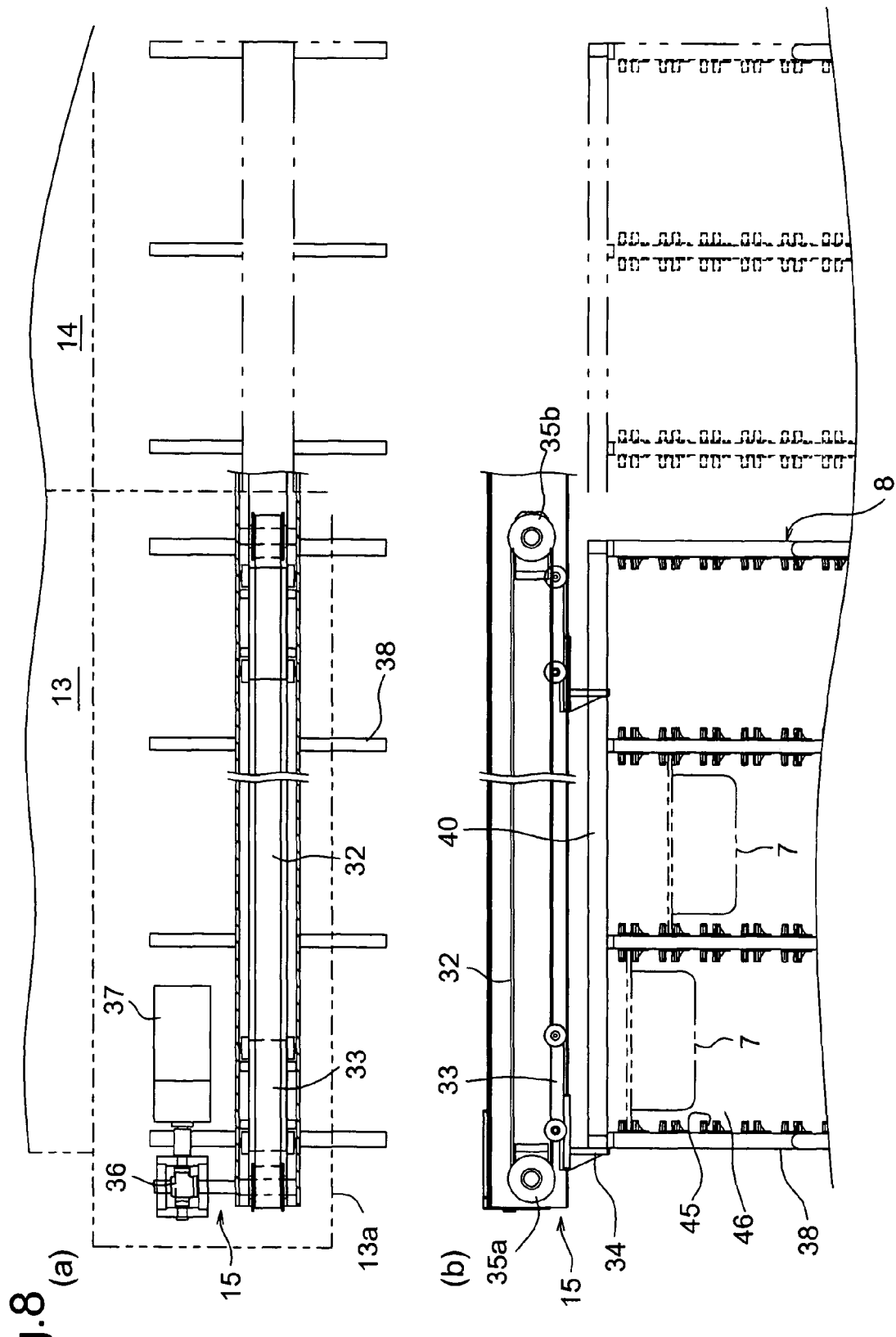
FIG. 8(a) is a plan view of FIG. 7
FIG. 8(b) is a front sectional view showing a part of FIG. 8(a)

The cart transfer member 15, as shown in FIG. 8, comprises a drive belt 32 provided on the upper portion of the cart standby portion 13 and the tray supply portion 14, a slider 33 fixed on the drive belt and a pusher 34 extending downward from the slider 33. The belt 32 is engaged with pulleys 35a, 35b provided on both side. A drive power is transferred to one pulley 35a via a pair of gears 36 from the shaft of the transfer motor 37. The pusher 34 is arranged to push one end surface of the empty cart 8 disposed in the cart standby portion 13 to transfer it to the tray supply portion 14.

Figure 12:
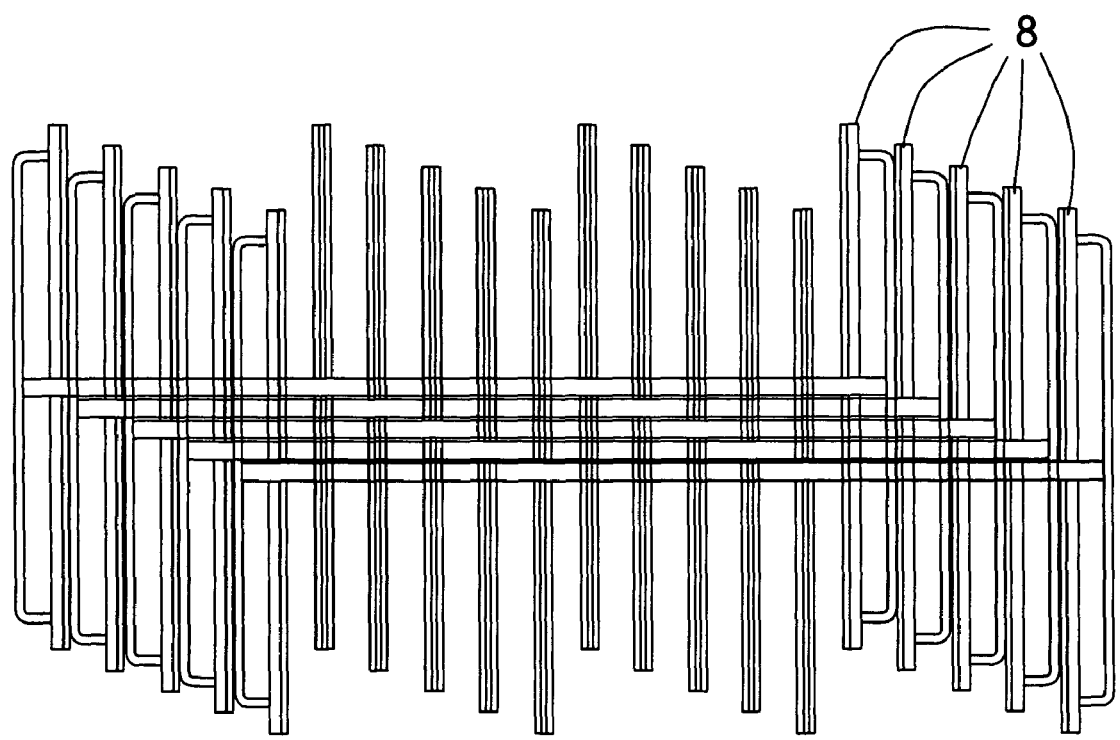
FIG. 12 is a plan view showing a state in which a plurality of carts is put together.

The cart 8, as shown in FIG. 3, is an integrated construction comprising four support panels 38 kept upright at a predetermined interval, an upper connection member 40 connecting each middle portion of upper ends of the support panels and a lower connection member 41 connecting each leg portion 39 protruded from the middle portions of the lower ends of the support panels. In the support panels 38 positioned at both sides, grips 42 are provided respectively at the upper side edge portions and also casters 44 are provided respectively at both ends of a support portion 43 extended from the lower end of the leg portion 39. Thus, holding the grips 42 allows the cart 8 to freely move. On the opposite surfaces of the support panels 38, guide grooves 45 are formed at a predetermined interval in a vertical direction. The opposite guide grooves 45 constitute storage areas 46 for supporting the flange portions 11 of the tray 7. In the case where no tray 7 is stored in the storage area 46, it is possible to bring the carts 8 together as shown in FIG. 12 to reduce the storage space in nonuse. A reflection plate 47 (see FIG. 7) made of metal is provided on the middle portion of the lower surface of the lower connection member 41 so that the reflection plate 47 can be detected by a position displacement detection sensor 59 that will be described hereinafter.

The tray transfer line 3 is so constructed that a plurality of rollers (not shown) are driven to rotate and convey the tray 7 downstream, i.e., to the tray discharge apparatus 2.

The medicine dispensing apparatus 4 is so constructed that medicines are packed by one dose based on prescription data inputted from a server 78 or the like and dispensed to the tray 7 that is conveyed on the tray transfer line 3. On the lower portion of the medicine dispensing apparatus 4, a stopper (not shown) is provided to stop the tray 7 moving along the tray transfer line 3 if required.

The card rewriting apparatus 5 is constructed so that a predetermined matter can be printed on the identification card 12 provided on the tray 7 and, if already printed, the content can be rewritten and reprinted.

The stack lifter 6 is constructed so that the trays 7, which have been conveyed with the medicine contained, can be stacked and put on standby and then supplied to the tray discharge apparatus 2 sequentially.

The cart transfer apparatus 9 comprises a first cart transfer apparatus 9a for transferring the empty carts aligned on the cart supply line 48 and a second cart transfer apparatus 9b for aligning the carts 8 in which the trays 7 are stored at the tray discharge apparatus 2 with the cart discharge line 49 (the lines on which the cart transfer apparatuses 9a, 9b are disposed respectively are shown by two-dot chain line in FIG. 1).

Each of the cart transfer apparatuses 9a, 9b comprises a drive motor 52 (pulse motor), detection members 53, a control substrate 54, grip members 55 and so on which are provided on a frame 51 supported by four wheels 50. The wheels 50 are attached on the both end portions of the rotation axes rotatably supported by bearing portions 56. A drive power of the drive motor 52 is transmitted to the rotation axes via drive transmission belt 57. As the detection members 53, cart detection sensors 58 on the middle portions of both sides, a position deviation sensor 59, search sensors 60 and a third optical communication sensor 61 are provided.

Each of the cart detection sensors 58 comprises three juxtaposed optical sensors each having a light emitting element and a light receiving element. A light irradiated from the light emitting element is reflected on the lower surface of the lower connection portion 41 of the cart 8 and received by the light receiving element so that the lower connecting portion 41 is detected. All of the sensors are disposed so as to simultaneously detect the lower connecting portion 41.

The position deviation sensor 59 is used to detect the reflection plate 47 provided on the cart 8 and decide whether or not the cart 8 is positioned at the center of the cart supply line 48 or the cart discharge line 49, i.e., whether or not the cart 8 deviates from the center in the direction perpendicular to each line.

As the detection sensor 60, an ultrasonic sensor is used for example. The detection sensors 60 are disposed at a total of four places on both sides of the end portions of the cart transport unit 9, respectively, to detect the cart 8. For example, the detection sensor 60 is used when accessing the cart 8 in order to grip the cart 8 by means of the grip member 55 which will be described hereinafter, when detecting the presence or absence of the cart 8, when transporting the gripped cart 8, when detecting whether or not the cart 8 bumps against the other cart 8 and so on.

The third optical communication portion 61 conducts data transmission and reception with the first optical communication portion or the second optical communication portion 27 provided on the tray discharge unit 2.

The control substrate 54 controls the pulse signal which will be outputted to the drive motor 52 via the signal converter 63 from the pulse driver 62 based on the data received through the third optical communication portion 61.

Figure 6:
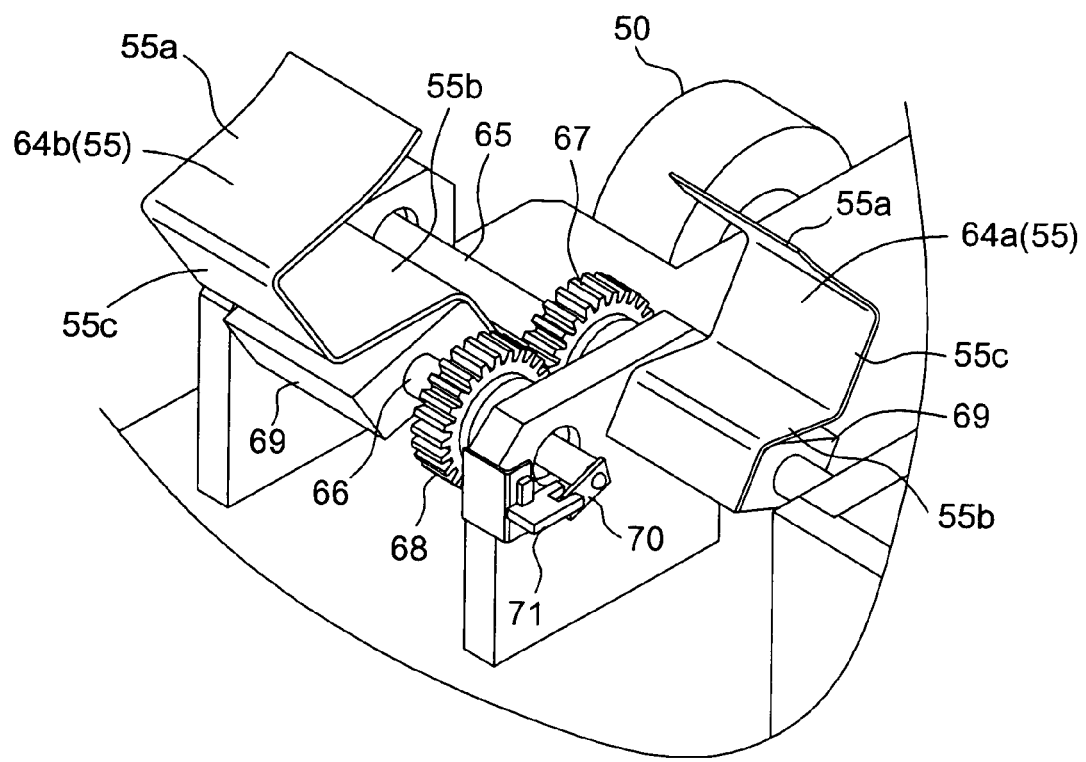
FIG. 6 is an enlarged perspective view showing a grip member provided on the tray transport unit.

Each of the grip members 55, as shown in FIG. 6, comprises a pair of grip arms 64a, 64b. The grip members 55 are disposed at the center portion of both sides of the frame 51, i.e. in the vicinity of the cart detection sensors 58, respectively. One grip arm 64a is fixed on the drive shaft 65 which is rotatable forwardly and reversely due to drive of a motor (not shown). The other grip arm 64b is fixed on the driven shaft 66. A drive gear 67 provided on the drive shaft 65 and a driven gear 68 provided on the driven shaft 66 are engaged with each other so that both grip arms 64a, 64b rotate synchronously. Each of the grip arms 64a, 64b is made of metal plate material bent into an upper plate portion 55a, a lower plate portion 55b and a side plate portion 55c for guiding three surfaces (upper, lower and one of the side surfaces) except the other side surface of the lower connection portion 41 of the cart 8. The upper plate portion 55a and the lower plate portion 55b are formed so as to expand gradually toward the end from the side plate portion 55c, thereby enabling the lower connection portion 41 to be gripped without interference. Also, the grip arms 64a, 64b are elastically deformable themselves, enabling absorption of some deviation and sure gripping of the lower connection portion 41. Each of the grip arms 64a, 64b are attached on support tables 69 of substantially rectangular parallelepiped shape fixed on each of the shafts. The side plate portion 55c of one grip arm 64a and that of the other grip portion 64b can guide the lower connection portion 41 from the side surfaces. Therefore, even if the cart 8 is skewed by a certain degree with respect to the cart transport unit 9, it is possible to correct its position to a proper position. A sensor dog provided on part of the driven shaft 66 is detected by a grip position detection sensor 71, allowing the grip arms to stop its rotation.

Figure 5:
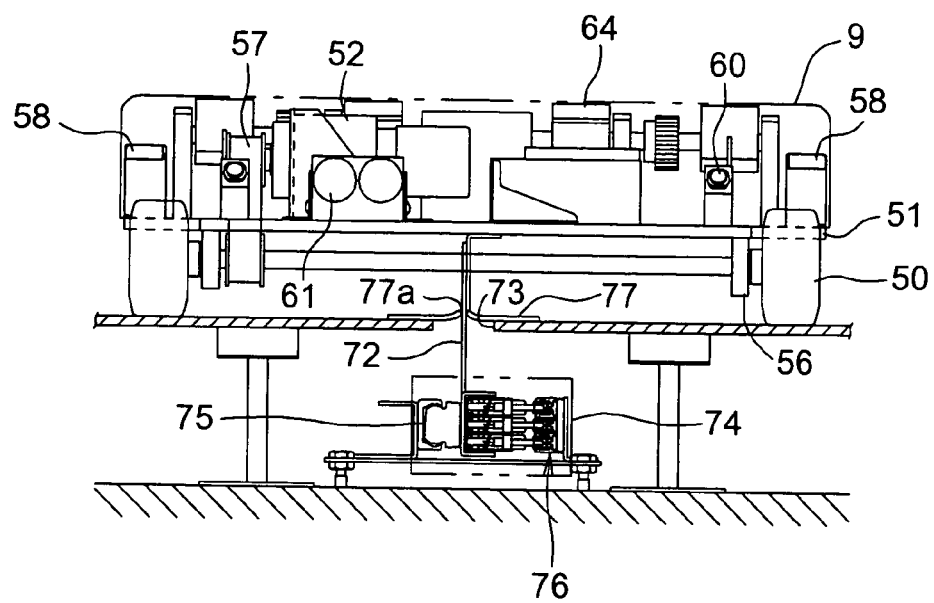
FIG. 5 is a front view showing an internal structure of the tray transport unit and floor.

In the frame 51 of the cart transport unit 9, as shown in FIG. 5, a current collecting arm 72 is provided to extend downwardly from the bottom. The current collecting arm 72 serves as a power supply path for supplying power to the motor and so on.

On the floor constituting the car supply line 48 and the cart discharge line 49, as shown in FIG. 5, a slit 73 is formed. A power supply unit 74 is provided beneath the slit 71. In the power supply unit 74, a guide rail 75 and a trolley 76 for power supply are disposed so as to oppose each other. The guide rail 75 is capable of guiding the current collecting arm 72 and moving the cart transport unit 9 along the line. The trolley 76 supplies power to the cart transport unit 9 via the current collecting arm 72. The upper opening portion of the slit 73 is covered by a cover 77 made of flexible material. The cover 77 is formed with a slit 77a in which the current collecting arm 72 is movable.

The control unit 10, as shown in FIG. 11, controls the drive of the medicine dispensing unit 4, each roller of the tray transport line 3, the tray discharge unit 2 and so on based on prescription data received from a server 78 and so on or inputted by an input unit (for example, keyboard, mouse, touch panel and so on).

Next, operation of the medicine supply system having the above construction will be described.

First of all, the empty carts 8 are disposed and aligned on the cart supply line 48. That is to say, each of the carts 8 is disposed so that the lower connection portion 41 is orthogonal to the cart supply line 48 and both sides of the lower connection portion 41 are substantially equalized with respect to the cart supply line 48. This arrangement may be not so accurate.

Figure 14:
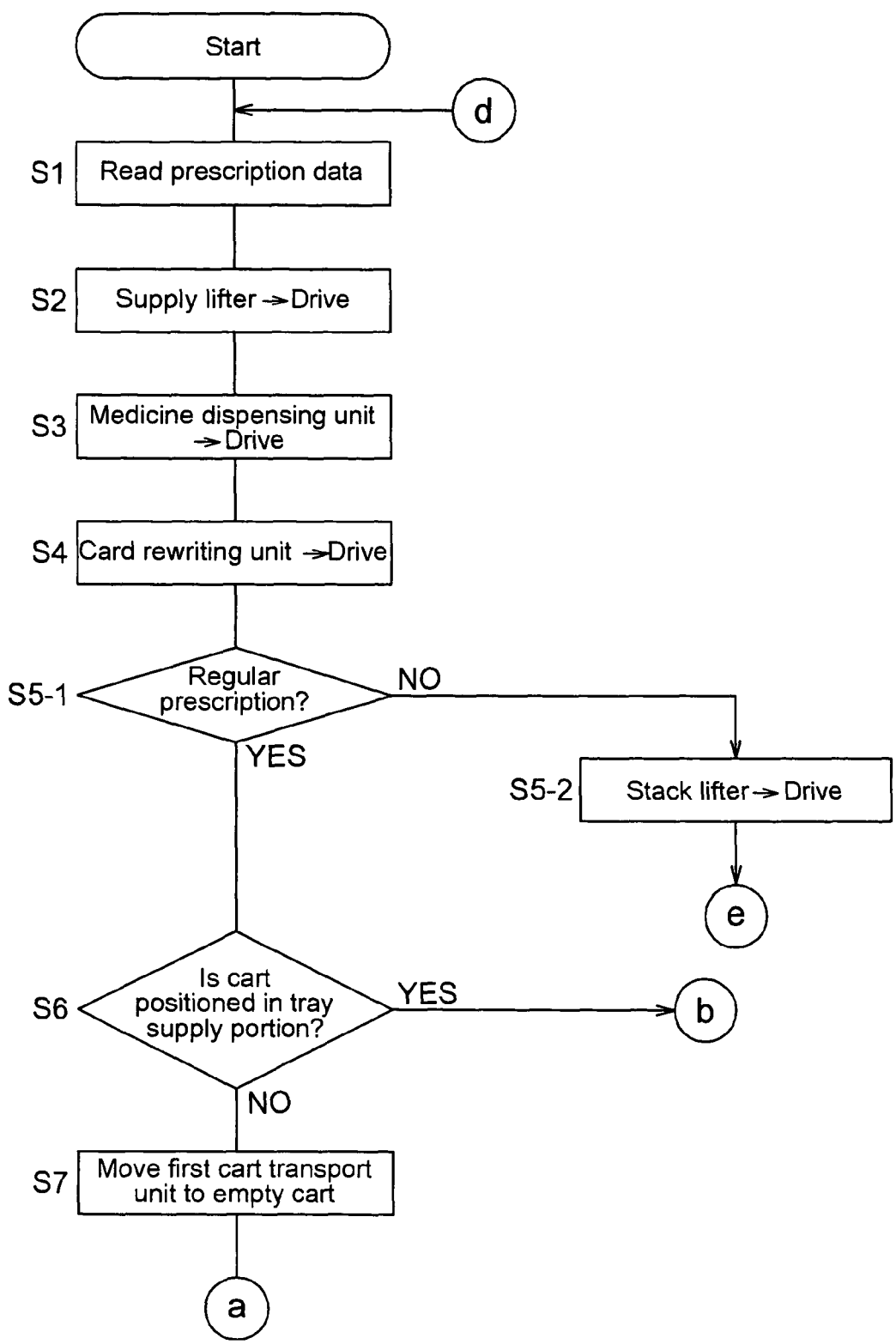
FIG. 14 is a flow chart showing processes in the medicine supply system according to the present invention.
Figure 15:
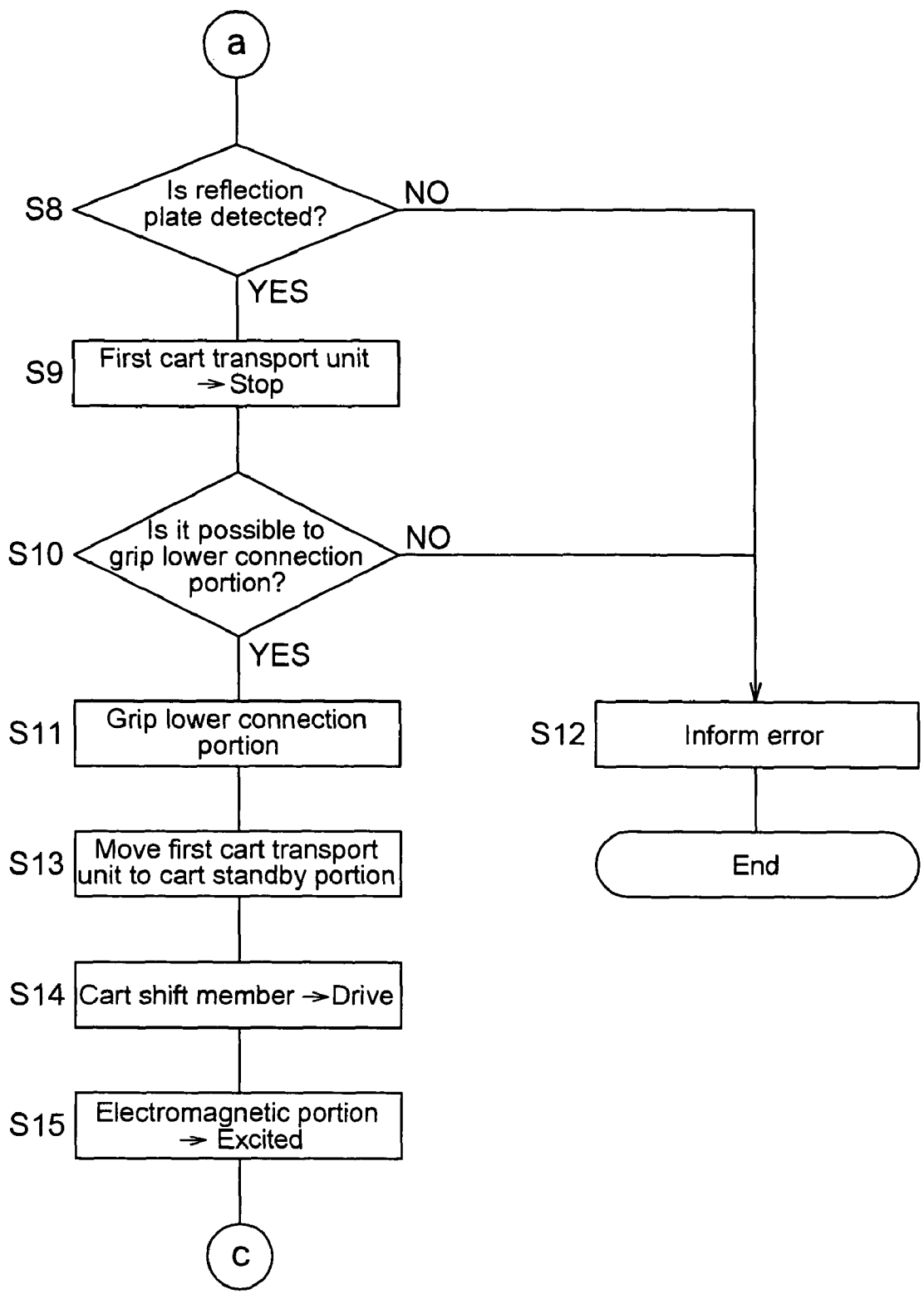
FIG. 15 is a flow chart continued from FIG. 14.
Figure 16:
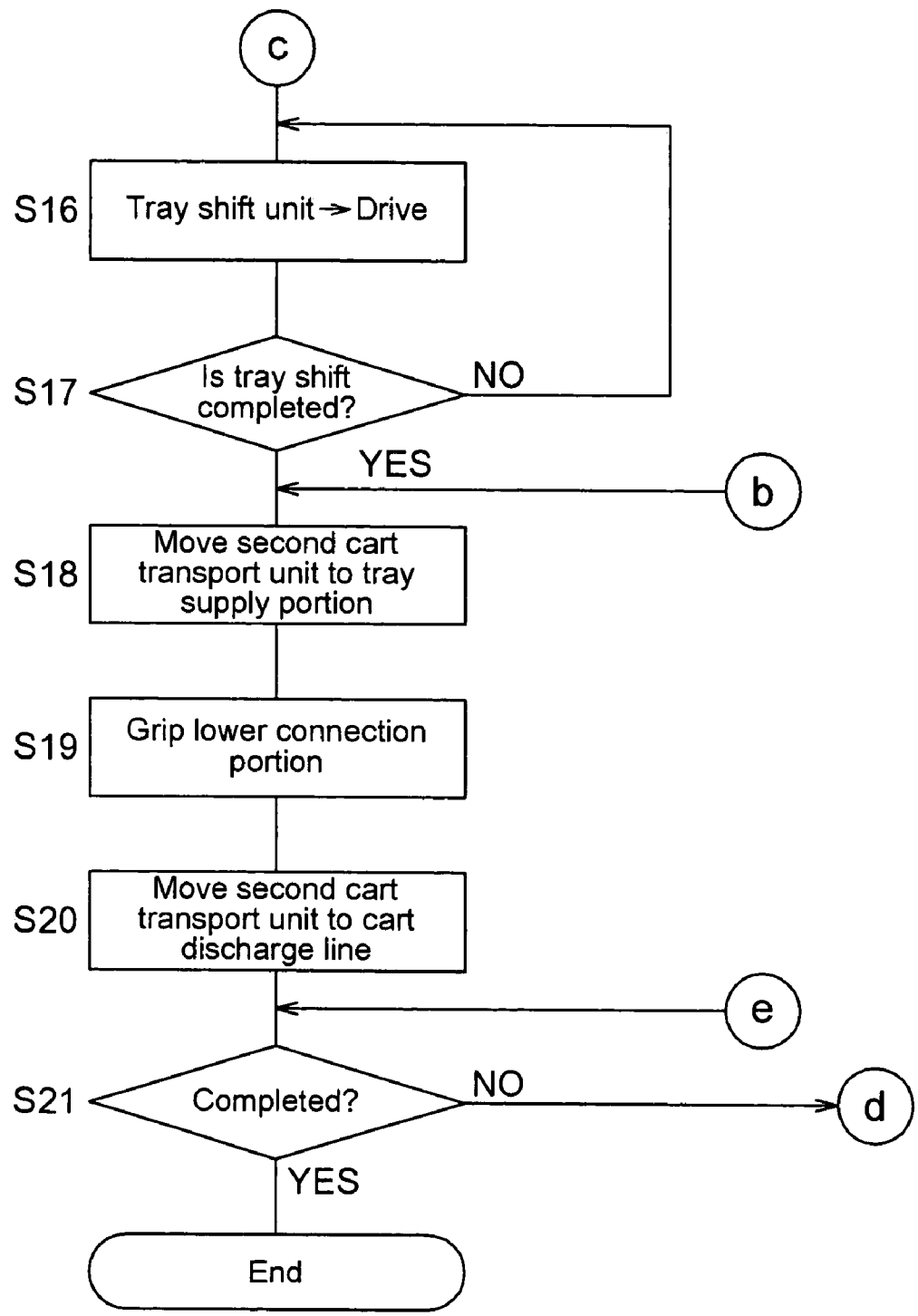
FIG. 16 is a flow chart continued from FIG. 15.

As shown in the flowcharts in FIGS. 14 to 16, based on the prescription data inputted from the server 8 and so on (Step S1), the control unit 10 drives the supply lifter 1 (Step S2) to supply the trays 7 to the tray transport line 3. In the tray transport line 3, rollers (not shown) are driven to transport the supplied trays 7 to the medicine dispensing unit 4. When the tray 7 is moved to the medicine dispensing unit 4 to receive the medicine indicated by the prescription data, the tray is stopped by a stopper (not shown), causing the medicine to be discharged. If all of the medicine cannot be dispensed by one medicine dispensing unit 4, the tray 7 is also stopped at another medicine dispensing unit 4 to allow the medicine to be dispensed.

If the medicine is completely dispensed, patient data such as patient name and so on, medicine data such as prescribed medicine name and so on, and address data such as ward name and so on are printed on the identification card 12 attached on the tray 7 by the card rewriting unit 5 (Step S4). If anything is printed, it is rewritten. When printing of the identification card 12 is completed, it is decided whether or not the medicine contained in the tray 7 is a regular prescription (Step S5-1). If it is a regular prescription, the processing is shifted to the next step. If it is decided that the medicine is not a regular prescription but a temporary prescription, the tray 7 is stacked in the stack lifter 6 so that it can be removed (step S5-2). Thus, even in the case of an urgent prescription for a patient whose condition is rapidly changing, it is possible to put the tray on standby in the stack lifter 6 without storing the tray in the cart 8 to promptly cope with the urgency.

In the tray discharge unit 2, the second optical communication portion 27 of the tray supply portion 14 communicates with the third optical communication portion of the second cart transport unit 9b. It is decided based on the detection result of the detection sensor 60 of the second cart transport unit 9b whether or not the cart 8 is positioned at the tray supply portion 14 (Step S6). If the cart 8 is not positioned at the tray supply portion 14, the first optical communication portion 16 of the cart standby portion 13 communicates with the third optical communication portion 61 of the first cart transport unit 9a and the first cart transport unit 9a is moved to the empty cart 8 closest to the tray discharge unit 2 based on the detection result of the detection sensor 60 of the first cart transport unit 9a (Step S7). If it is positioned at the tray supply portion 14, the processing is shifted to Step S18 which will be described hereinafter.

In this case, the first cart transport unit 9a is moved at a high speed until it is decided by the detection sensor 60 positioned at the side of moving direction of the first cart transport unit 9a that the first cart transport unit 9a approaches the cart 8 by a predetermined distance. When it is decided that the first cart transport unit 9a approaches the cart 8 by a predetermined distance, the speed is reduced. In detail, the first cart transport unit 9a is moved at the high speed (constant speed) until the distance to the cart 8 becomes a first set distance; and if the distance reached the first distance, the moving speed of the first cart transport unit 9a is decelerated by one-fourth. When the distance to the cart 8 becomes a second set distance smaller than the first set distance, the moving speed is further decelerated by one-sixth with respect to the high moving speed.

When a predetermined time has passed while the position deviation detection sensor 59 does not detect the reflection plate 47 (Step S8; NO), it is decided that the position of the cart 8 is deviated in the direction perpendicular to the cart supply line 48 and an error is indicated (Step S12).

When the position deviation detection sensor 59 detects the reflection plate 47 (Step S8; YES), the first cart transport unit 9a is stopped (Step S9). Then, it is decided, based on the detection signal of the cart detection sensor 58, whether or not a gripping operation of the grip members 55 is possible (Step S10). This decision is conducted in accordance with whether or not at least two optical sensors of each cart detection sensor 58 are positioned at both sides of the cart transport unit 9a.

If it is decided that gripping operation of the grip members 55 is possible (Step S10; YES), the motor (not shown) is driven to rotate the grip arms 64a, 64b to grip the lower connection portion 41 (Step S11). At this time, the lower connection portion 41 is guided as both side surfaces are pushed by the side plate portions 55c of each of the grip arms 64a, 64b, allowing correction of the cart even if the cart is positioned so that the lower connection portion 41 is skewed to a certain degree with respect to the direction perpendicular to the cart supply line 48.

If it is decided that gripping operation of the grip members 55 is impossible, that is to say, the skewed angle of the lower connection portion 41 with respect to the direction perpendicular to the cart supply line 48 is too large for the grip arms 64a, 64b to grip the lower connection portion 41 (Step S10; NO), an error is indicated (Step S12).

If the lower connection portion 41 is held by the grip arms 64a, 64b, the first cart transport unit 9a is moved to the cart standby portion 13 of the tray discharge unit 2 (Step S13). Even when moving to the cart standby portion 13, the first cart transport unit 9a is moved at high speed until the unit approaches at a certain distance; and if the unit has approached a certain distance 1, the unit is stopped or the speed is decreased. In detail, the first cart transport unit 9a is moved at the high speed until the distance to the cart standby portion 13 becomes a first set distance; the moving speed is decelerated by one-sixth until the distance becomes a second set distance from the first distance; and when the distance becomes the second distance, the unit is stopped. At this time, the pusher 34 of the cart shift member 15 is moved to the end portion of the cart standby portion 13. Also, the guide piece 20 of the guide member 17 is elevated to prepare for moving the cart 8 to the cart standby portion 13. Moving the pusher 34 and elevating the guide piece 20 are conducted provided that the preceding cart 8 is not positioned at the cart standby portion 13. Thus, failure caused by the carts 8 colliding against each other is prevented.

The first transport unit 9a is further driven to move the empty cart 8 to the cart standby portion 13 based on the detection signal of the detection sensor 60. At this time, the pulse number of the applied voltage to the drive motor 52 is controlled to adjust the distance to a distance calculated based on the detection signal of the detection sensor 60.

When the empty cart 8 is positioned at the cart standby portion 13, the guide piece 20 of the guide member 17 is lowered to prevent the cart 8 from deviating at the time of shifting the cart 8. Also, the gripping state of the grip member 55 is released and the first cart transport unit 9a retreats from the empty cart 8. It is decided based on the detection result of the detection sensor 60 obtained from communication between the second optical communication portion 27 and the third optical communication portion 61 whether or not the cart 8 is positioned at the tray supply portion 14. If no cart 8 is positioned at the tray supply portion 14, the pusher 34 of the cart shift member 15 is moved so that the empty cart 8 is moved to the tray supply portion 14 from the cart standby portion 13 (Step S14). The empty cart 8 is moved while it is prevented by the guide member 17 (guide piece 20 and guide roller 30) and the guide cover 31 from moving laterally.

When the cart 8 is moved to the tray supply portion 14, the electromagnetic portion 28 is excited to attract and position the cart 8 (Step S15). Then, the tray shift unit 21 is driven to store the medicine contained tray 7 in the storage area 46 continuously (Step S16). As the cart 8 is positioned by the electromagnetic portion 28 and guided by the guide roller 30, the cart is never displaced during the work of storing the trays 7.

The position of the storage area 46 in which the trays 7 are stored can be set, for example, as shown in FIGS. 13(a) to 13(c).

FIG. 13(a) shows an example in which the trays 7 are stored from 1st to 12th in order of the receipt number of prescription data accepted by the server 78. FIG. 13(b) shows an example in which storage stages are different based on the hospital wards. The trays A-1 to A-5 for the hospital ward A are stored in the first and second stages; the trays B-1 and B-2 for the hospital ward B are stored in the third stage; and the trays C-1 to C-3 for the hospital ward C are stored in the fourth stage. FIG. 13(c) shows an example in which storage rows are different according to the hospital wards. In this case, differentiating the colors of trays 7 based on the hospital wards is preferable in that the operator can easily discriminate them. In the case of cart 8, as shown in FIG. 8, as the guide grooves 45 are provided with a half pitch with respect to the storage space of the tray 7, it is possible to store the trays 7 in the stages shifted by a half pitch, thereby allowing the trays to be discriminated by the hospital wards. If number of guide grooves 45 is increased, it is possible to provide the trays 7 with various pitches such as one-third pitch with respect to the storage space of the tray 7.

When the work of storing the trays 7 into the cart 8 is completed (Step S17: YES), the second cart transport unit 9b is driven through the second optical communication portion 27 of the tray supply portion 14 and the third communication portion 61 of the second cart transport unit 9b to move the cart 8 to the tray supply portion 14 (Step S18). For example, in the storage pattern of FIG. 13(b), if the delivery address (ward)

data of the next tray is different from that of the previous tray, the control unit 10 stores the tray in the storage area of the next stage. If no next stage is present, a tray storage completion signal is transmitted to the third optical communication portion 61 of the second transport unit 9b via the second optical communication portion of the tray supply portion 14. When the second communication portion 61 receives the tray storage completion signal, the second tray transport unit 9b moves the cart 8 to the tray supply portion 14. Then, the lower connection portion 41 of the cart 8, positioned at the tray supply portion 14, is gripped by the grip arm 64 of the grip member 55 (Step S19). Subsequently, the electromagnetic portion 28 is demagnetized to release the attracted state of the cart 8. After that, the guide roller 30 is elevated to allow the cart 8 to move to the cart discharge line 49. Then, the second cart transport unit 9b is driven to move the cart to a predetermined position on the cart discharge line 49 (Step S20).

In a similar way, the empty cart 8 of the cart supply line 48 is transported to the tray discharge unit 2 by the cart transport unit 9. After the trays 7 are stored, the cart 8 is moved to the cart discharge line 49. In the cart discharge line 49, the carts 8 may be disposed at even intervals, though it is possible to dispose the carts 8 at different intervals in accordance with the transport address of the carts 8. For example, if there are three carts 8 to be transported to the hospital ward A, these carts are disposed at even intervals. Subsequently, if there are two carts 8 to be transported to the hospital ward B, these carts can be disposed at even intervals and with a large distance to the group of carts 8 to be transported to the hospital ward A. This allows the operator to easily discriminate the carts 8 during transportation to each of the hospital wards, which would be convenient.

Thereafter, with respect to all prescription data inputted in the control unit 10, dispensing the medicine to the trays 7 and storing the trays 7 with the medicine dispensed in the cart 8 is completed (Step S21: YES), the processing is terminated. If not completed (Step S21: NO), the processing is returned to Step S1 to repeat the same processing.

The above-described processing is effective in a case where the medicines are contained in the trays 7 and the trays 7 are stored in the cart 8 at night or so.

In the above embodiment, the cart transport unit 9 is provided with the detection sensors 55, though it is also preferable to further provide a vibration sensor. Even if the detection sensors 55 are unable to detect any obstacles, the vibration sensor detects vibration generated when the cart transport unit 9 collides with the obstacle. Based on the vibration, an error is indicated and the cart transport unit 9 is stopped. This more reliably prevents any trouble that would be caused during movement of the cart transport unit 9.

The invention claimed is:

1. A medicine supply system, comprising:
 a plurality of carts each having a plurality of storage areas in which trays can be stored;
 a cart supply line on which the plurality of carts, with the plurality of storage areas empty, are disposed and aligned;
 a first transport unit for sequentially transporting the plurality of carts aligned on the cart supply line;
 a cart standby portion for receiving one of the carts, transported by the first transport unit, and putting the cart on standby;
 a tray supply portion for storing medicine-containing trays in the cart;
 a cart shift member for shifting the cart on standby from the cart standby portion to the tray supply portion;
 a second transport unit for transporting the cart, with the medicine-containing trays stored therein, from the tray supply portion;
 a cart discharge line on which a plurality of the carts, transported by the second transport unit, are aligned;
 an empty tray supply unit for supplying the trays in an empty state;
 a tray transport line for transporting the trays, supplied by the empty tray supply unit, to the tray supply portion;
 a medicine dispensing unit for dispensing medicine to the trays, the medicine dispensing unit being disposed on an intermediate portion of the tray transport line;
 a control unit operable to control supplying the trays from the empty tray supply unit based on prescription data, dispensing the medicine included in the prescription data into the trays, transporting the medicine-containing trays to the tray supply portion, and storing the trays in the carts supplied from the cart supply line; and
 a stack lifter provided on the tray transport line for stacking medicine-containing trays and putting the trays on standby,
 wherein, if the control unit determines that the medicine dispensed into one of the trays on the tray transport line by the medicine dispensing unit is a temporary prescription, the control unit allows the stack lifter to stack the trays and put the trays on standby.

2. The medicine supply system as in claim 1, wherein the tray standby portion, the tray supply portion, the first transport unit and the second transport unit have communication portions, respectively, and wherein the control unit allows the first transport unit and the second transport unit to transport the carts through the respective communication portions.

3. The medicine supply system as in claim 2, wherein after completion of storage of the trays into the carts, the control unit transmits a tray storage completion signal to the communication portion of the second transport unit through the communication portion of the tray supply portion; and
 wherein, after the communication portion of the second transport unit receives the tray storage completion signal, the second transport unit transports the cart.

4. The medicine supply system as in claim 2, wherein the communication portions communicate with each other through optical communication.

5. The medicine supply system as in claim 1, wherein a card rewrite unit is provided on the tray transport line to rewrite predetermined information on an identification card attached on the tray with the medicine dispensed by the medicine dispensing unit, and
 wherein the control unit allows card rewrite unit to rewrite the predetermined information on the identification card based on the prescription data inputted and allows the tray supply portion to store the tray with the identification card attached into the predetermined storage area of the cart.

6. The medicine supply system as in claim 3, wherein the communication portions communicate with each other through optical communication.

7. The medicine supply system as in claim 2, wherein a card rewrite unit is provided on the tray transport line to rewrite a predetermined information on an identification card attached on the tray with the medicine dispensed by the medicine dispensing unit, and
 wherein the control unit allows card rewrite unit to rewrite the predetermined information on the identification card based on the prescription data inputted and allows the tray supply portion to store the tray with the identification card attached into the predetermined storage area of the cart.

8. The medicine supply system as in claim 3, wherein a card rewrite unit is provided on the tray transport line to rewrite a predetermined information on an identification card attached on the tray with the medicine dispensed by the medicine dispensing unit, and wherein the control unit allows card rewrite unit to rewrite the predetermined information on the identification card based on the prescription data inputted and allows the tray supply portion to store the tray with the identification card attached into the predetermined storage area of the cart.

9. The medicine supply system as in claim 4, wherein a card rewrite unit is provided on the tray transport line to rewrite a predetermined information on an identification card attached on the tray with the medicine dispensed by the medicine dispensing unit, and wherein the control unit allows card rewrite unit to rewrite the predetermined information on the identification card based on the prescription data inputted and allows the tray supply portion to store the tray with the identification card attached into the predetermined storage area of the cart.

* * * * *